Sept. 29, 1959      K. N. BROWN      2,906,803
PROCESS FOR MAKING POROUS ELECTRODES AND THE LIKE
Filed Aug. 22, 1955      2 Sheets-Sheet 1

K.N. BROWN
INVENTOR.

BY Karl F. Ross
AGENT

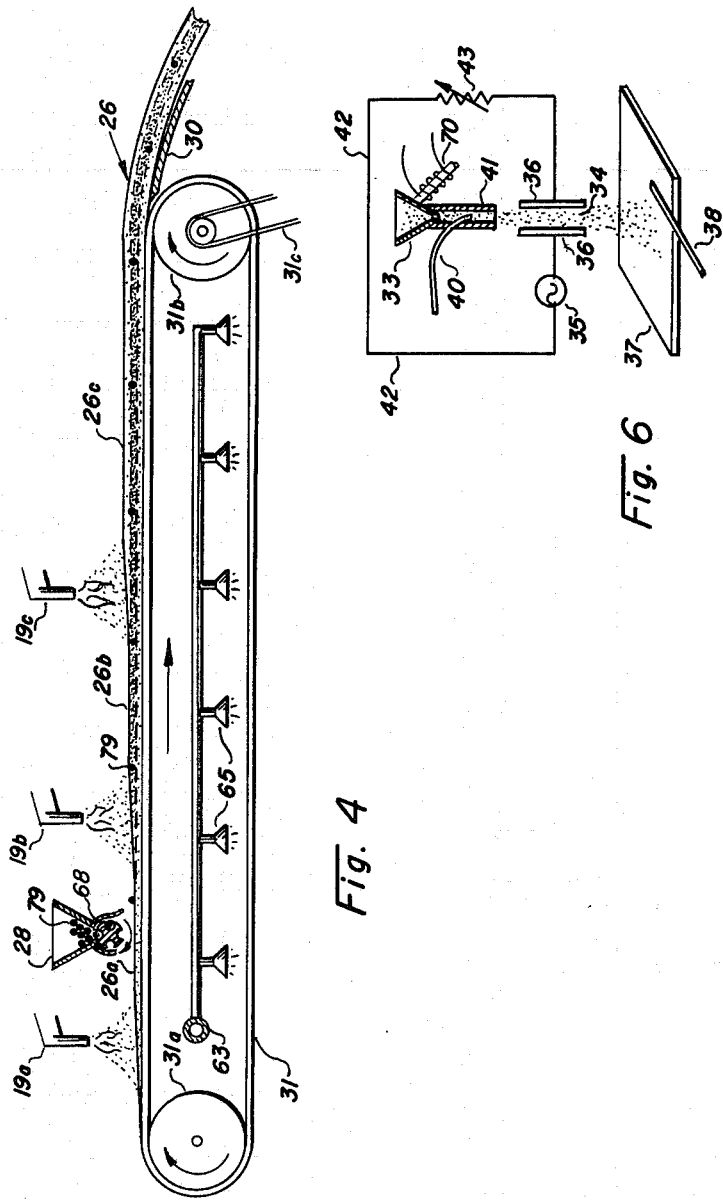

United States Patent Office 2,906,803
Patented Sept. 29, 1959

2,906,803

PROCESS FOR MAKING POROUS ELECTRODES AND THE LIKE

Kenneth N. Brown, Teaneck, N.J., assignor to Yardney International Corp., New York, N.Y., a corporation of New York Application August 22, 1955, Serial No. 529,676

3 Claims. (Cl. 136—73)

The present invention relates to the manufacture of porous electrodes for electric batteries and other uses.

The manufacture of porous metallic bodies for battery electrodes has conventionally been accomplished by pressing powdered active material into a desired form, usually that of a plate. With some metals it is feasible to increase the strength of the compressed body by sintering. In the usual sintered electrode it has been necessary to incorporate a supporting structure or grid which does not participate in the electrochemical reaction and often increases the thickness of the electrode to a not inconsiderable extent. The formation of a self-supporting plate of sintered material has heretofore been found practical only in the case of silver, as disclosed in U.S. application Ser. No. 319,406, now Patent No. 2,818,462, filed on November 7, 1952 by Frank Solomon.

Some of the problems arising in the production of a self-supporting electrode by the sintering process are due to the difficulty of maintaining a uniform porosity and density in a relatively thick plate composed of discrete and coherent comminuted particles. This results in part from the temperature gradients developed in the sintering oven in which, during the relatively short treatment time required for economical as well as technical reasons, only the surface layer of the electrode plate is brought up to the operating temperature while the interior remains at a somewhat cooler level. Further differences in strength and porosity at the exterior and interior portion of the plate are caused by poor transmission of pressure by the powder. Thus the final electrode slab may be either externally densified with resulting inadequate effective surface area or internally weak and poorly conductive on account of the low cohesion of the particles at its center. When electrodes of a shape other than flat plates of simple outline are required, it is even more difficult to produce porous bodies of uniform density.

An alternative method of making porous electrode bodies is by electrolytic deposition. While the aforementioned disadvantage of non-uniformity encountered in sintering does not arise in this case, the electrolytic process is time-consuming and relatively expensive.

An object of the instant invention is to provide a method of forming a body of uniform or otherwise predetermined thickness, composition, porosity, strength, flexibility, and surface, mechanical and electrical characteristics from particulate solid matter.

A further object is to provide a method of forming a body of uniform and/or controllable composition and other characteristics, which is either self-supporting or bonded to a relatively thin supporting structure therefor.

Still a further object is to provide a method of forming electrodes, which is adaptable to mass production, quick start-up and rapid changeover.

Another object of the present invention is to provide a method of forming electrodes of complicated structure or outline on a mass production basis.

A further object is to make an electrode of substantial porosity having a surface which is smooth and similar to that of a rolled sheet of metal, being thus free from projections which could serve as nuclei for crystal growth and which could mechanically injure an adjacent layer of separator material.

Still a further object is to provide a more economical and expeditious alternative to the production of porous electrode bodies by electrolytic deposition.

Yet another object is to provide a simple and practical method of producing a plate of a degree of porosity that would be impractical to fabricate by the use of ordinary powder-metallurgical techniques such as pressing or rolling and sintering.

A feature of this invention resides in mixing an active electrode material in finely divided form with a stream of carrier gas, then passing the mixture of gas and solid particles through a zone of elevated temperature well above the melting point of the particles at a controlled rate, thereby melting substantially only the periphery of each particle, and directing the heated and partially melted particles onto a collector surface whereat these particles are allowed to cool so as to adhere to the surface and to one another. As this spray of hot particles against the collector surface is continued, a porous layer of finite and appreciable thickness is developed.

The collector surface may be arranged to be peeled away from the porous layer of electrode material thus finally formed, or the collector surface may be left in contact with and act as a supporting structure for the porous layer produced as above and may serve to provide better electrical conductivity.

Instead of directly heating the particles in the gaseous stream, as by exposing them to a flame, it is also feasible to drive the particles through a high-frequency electric field adapted to produce the desired heating effect by means of induced currents.

It has been found that the density of the porous layer produced is determined both by the particle size and by the temperature to which the particle surfaces are subjected, as well as by the length of time for which the particles remain in the heating zone.

For a specific powder, therefore, it is possible to obtain in an electrode formed therefrom a desired degree of porosity by proper control of the temperature, whereby the density of the product may be maintained constant throughout or varied as desired. Thus, in contradistinction to the sometimes unavoidable external densification of electrode plates as obtained by pressing and sintering, it is feasible by the process of the present invention to form an electrode plate having a less porous and, therefore, more highly conductive inner core sandwiched between more porous surface layers.

It may be mentioned that porous electrodes so produced largely consist of particles arranged in random fashion, in contradistinction to plates formed by electrodeposition wherein, generally, a distinct polar orientation of the particles will be ascertainable.

The invention will be more fully described in connection with the accompanying drawing in which:

Fig. 4 illustrates a system for forming electrodes according to this invention by a continuous process;

Fig. 6 illustrates a modified system for forming electrodes in accordance with the invention.

Figure 1:
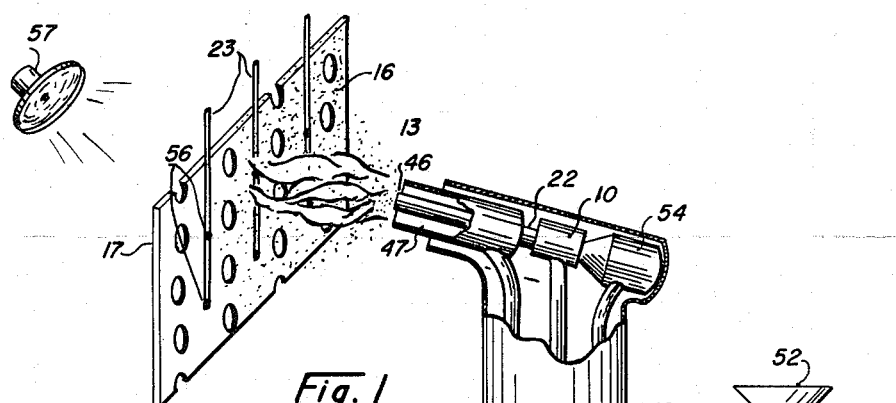
Fig. 1 illustrates a system for producing a porous electrode in accordance with the invention.

In Fig. 1 an electrochemically active metal powder 11 is stored in a container 12 having an inlet funnel 52. A conduit 53 serves to transfer the powder to a nipple 21 of a spray gun 19. Another nipple 20 represents an inlet for an impelling gas under pressure, derived from a source not shown, which passes from nipple 20 via a pressure chamber 54 to a mixing chamber 10 also connected to nipple 21. The powdered material 11 is entrained by the gas under pressure and passes through a barrel 22 extending outwardly from chamber 10.

The tip 46 of barrel 22 also communicates, via concentric duct 47 leading to a mixer valve 55, with a source of oxygen and a source of fuel gas (not shown) through respective pipes 14 and 15. A pistol grip assembly 19 supports the conduits leading into barrel 22 so that the stream of powdered metal, carrier gas, combustible gas and oxygen may be conveniently directed and controlled. A perforated backing plate adapted to support an electrode during its formation is indicated at 17. Plate 17 may be made of copper, zinc, silver or any other heat-resistant material which will not react objectionably with the powder 11. Wires 23 are intended as terminal leads for the finished electrodes which are to be cut from the electrode body 16 formed on surface 17. These wires may be attached by spot welding, e.g. as indicated at 56, to the surface 17 before the formation of the porous electrode layer is begun.

The above-described device operates as follows:

The powder 11, which may be, for example, silver of a particle size of −40, +325 mesh, passes from feeder or container 12 through conduit 53 to mixing chamber 10 by virtue of the suction created in the mixing chamber by the passage of the impelling gas therethrough. This impelling gas may be air at, say 8 p.s.i.g. (120 cm. Hg) pressure. The impelling gas carries the particular material, at a rate controlled by regulation of the pressure of said gas in the pressure chamber, through the barrel 22 into a heating zone 13 which is maintained at a temperature well above the melting point of the powder. The heat to produce the required temperature of zone 13 is provided by the ignition of the mixture of air and fuel gas, such as propane, at the barrel end 46, thereby producing a flame which surrounds and permeates the stream of particulate material in zone 13.

In this manner the particles of silver are heated sufficiently to melt at their surface so as to adhere to one another and to the surface of the collector plate 17 upon subsequently striking the latter and cooling. Thus, a porous layer 16 of electrochemically active material is formed on plate 17 as shown. Collector plate 17 may be cooled by suitable means, shown here schematically as a fan 57, to bring its temperature well below the melting point of the powder and prevent oxidation of the porous plate material, although in many instances simple convective air cooling alone will be sufficient.

As this spray of more or less fused particles is continued against the collector plate 17, the porous layer 16 is built up to a desired thickness and envelops the lower ends of terminal wires 23. The spray gun 19 and the plate 17 may be moved relatively to each other manually or by an automatic transport system to distribute the powder layer, uniformly or otherwise, over the porous slab.

The depth of zone 13, i.e. the length of the path traveled by each particle in its state of incipient fusion, as well as the amount of heat generated in the zone are preferably selected so that the bulk of these particles is melted only incompletely before reaching the plate 17.

By thus localizing the melting effect at the surface of these particles the same will substantially retain their original size and shape and will not transform into a substantially solid, non-porous mass on striking the plate 17. It will be understood that larger particle sizes will admit of higher temperature and/or longer transit times without complete fusion. Moreover, the porosity of the electrode produced is determined by the size and the degree of fusion of the impinging particles. In order to control the temperature of zone 13 for the purpose described, the ratio of fuel consumption versus rate of feed of the powder can be varied by means of valve 55 and similar valves (not shown) associated with the supply of the impelling fluid entering at nipple 20.

For example, increasing the rate of admission of impelling fluid with constant powder supply will reduce the amount of heat available for each particle and will also increase the speed with which the particles traverse zone 13, thereby diminishing the melting effect.

After formation of the layer 16, the plate 17 may be removed and a second layer formed in similar manner on the opposite side thereof.

By this process there will be produced a series of electrodes, each consisting to a substantial extent of discrete particles thermally fused together in a loose enough manner so as to form a highly porous structure not much denser than the original powder. In the case of silver, for instance, it has been found that the apparent density of a porous plate made in accordance with the process here disclosed is 2 grams per cubic centimeter compared with a density of 1.8 grams per cubic centimeter for the loose powder and a density of 3.8 to 5.2 grams per cubic centimeter for an electrode made by compressing and sintering of the same powder.

In the case of zinc, a plate of a porosity of 57% is formed from a powder of a porosity of 60%.

Similar relationships exist in the case of other metals; it should be noted, however, that in the case of certain metals, e.g. zinc, no comparative figures for pressed and sintered plates are available as no economic process for producing porous plates by this method appears to be known.

Figures 2, 3:
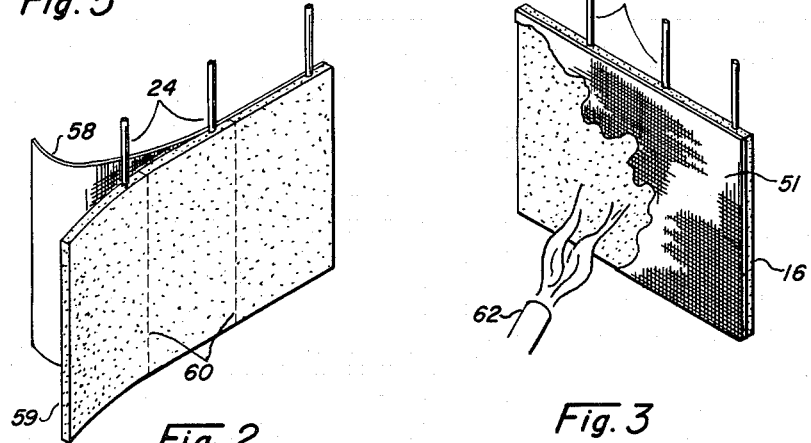
Fig. 2 illustrates one method of removing a support from an electrode formed according to Fig. 1.
Fig. 3 illustrates another method of removing a support from an electrode according to this invention.

In Fig. 2, a flexible backing surface 58 is shown as being peeled from a porous electrode body 59 produced by the process of my invention. The dotted lines 60 indicate where the completed electrode slab is to be cut or otherwise divided to form completed porous electrodes, each with a terminal wire 24; these wires are initially attached to support 58 so as to be readily removable therefrom.

In this manner, the surface of the layer 59 will be as smooth as the surface of the support 58 with which it had been in contact or will reflect any ridges, depressions, or other patterns originally appearing on the support. Layer 59 may itself be thin enough, e.g. of the order of one or two millimeters in thickness, so as to be bent or coiled as indicated in the drawing.

Fig. 3 illustrates a method of removing a combustible backing 51 from the electrode body 61 which has been formed by the instant process and in which terminal leads 69, similar to wires 23, are imbedded. A burner for this purpose, indicated at 62, may be identical with gun 19 of Fig. 1 operated with the gas supply 20 and powder supply 11 cut off. The strip 51 may be made of cardboard, paper, textile, plastic or other material whose ashes will not objectionably contaminate the finished electrode.

Fig. 4 illustrates a system for forming an electrode according to this invention by a continuous process. A continually moving belt 31 is carried on rollers 31a and 31b driven, in turn, by a belt 31c. Belt 31 passes under sprayers 19a, 19b and 19c, each similar to spray gun 19 of Fig. 1. A feeder 28 for wires 79, similar to wires 23, has a fluted cylinder 68 rotating thereunder. A stripper blade 30 is positioned adjacent roller 31b. Manifold 63 supplies air to nozzles 65 to cool the belt 31.

In the operation of the system illustrated in Fig. 4, the sprayers 19a, 19b and 19c form progressively superimposed layers 26a, 26b, 26c of porous metal on traveling collector plate 31, each in the same manner as the system of Fig. 1, thereby forming a final thick porous slab 26. The wires 79 are intermittently deposited upon the first layer 64 by the rotating cylinder 68.

The system of Fig. 4 is particularly adapted for the production of electrodes whose outer portions 26a and 26c are highly porous and of low density and whose central portion 26b is of higher density and lower porosity. For production of such a composite electrode, the sprayer 19b may be adjusted to deposit a denser layer than the sprayers 19a and 19c, as by being supplied with a more finely comminuted powder and/or being operated at a higher temperature.

One or more of the sprayers of Fig. 4, e.g. sprayer 19b, may also be used to distribute a dispersion of finely divided graphite in water over layer 26a after its formation by sprayer 19a. The suspending liquor is heated by the hot porous mass 26a on impact and removed by evaporation, leaving the porous mass impregnated with finely divided graphite. This impregnation of the porous metal layer serves to increase the conductivity of the composite mass in its oxidized or partly oxidized state.

Figure 5:
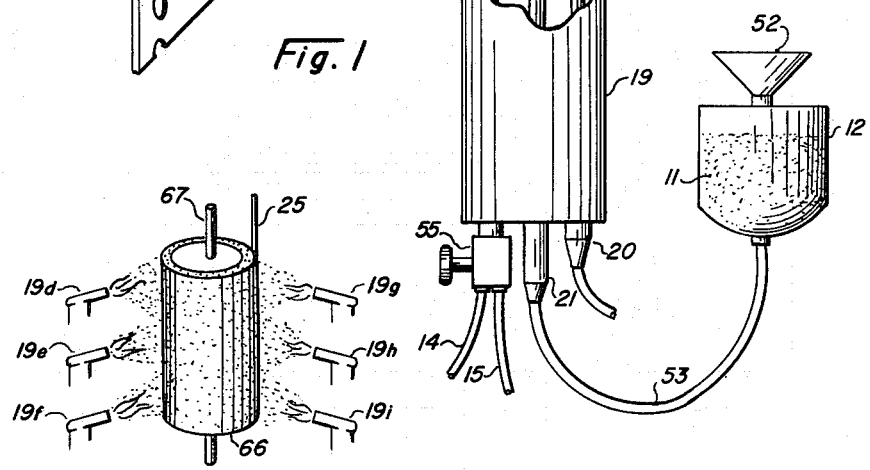
Fig. 5 illustrates a further system for forming an electrode according to this invention.

In Fig. 5, backing member 66 is in the form of a surface of revolution, here shown as a cylinder, with a conductor wire 25 attached thereto in the same manner as wire 23 is attached to plate 17 of Fig. 1. Surface 66 is rotated about its axis 67 while sprayers 19d, 19e, 19f deposit a series of parallel layers on adjacent annular zones and sprayers 19g, 19h, 19i deposit a second series of layers on top of the first series. As in the case of Fig. 4, the layers of the two series may be of different densities.

Fig. 6 illustrates an apparatus for forming a porous electrode by the use of inductive heating rather than by a hot gaseous stream to provide the thermal energy necessary to melt the surface of each particle. Container 33, with vibrator 70 attached thereto, is arranged to feed powdered electrochemically active material 39 through a channel 41 whereinto projects a tube 40 for injection of an entraining gas. Backing plate 37 and wire 38 are representative of any of the supports and terminal leads of Figs. 1–5. A source of high-frequency voltage 35 is connected by wires 42 and adjustable impedance 43 across plates 36 to provide a zone 34 of controlled inductive heating.

The entraining gas from tube 40, supplementing the action of gravity in the vertical system illustrated, serves to accelerate the passage of the particles through zone 34 in a controllable manner. Backing plate 37 or the combination of nozzle 41 with plates 36 may be moved manually or automatically with respect to each other to distribute the powder uniformly over the support.

By the instant process commercially available metal, e.g. zinc of 95–99.5% purity, may be utilized to form porous metallic electrodes without additional refining. Besides silver and zinc, metals such as cadmium, nickel, copper and iron as well as alloys thereof may be listed by way of example as suitable for the formation of an electrode or other porous object such as a gas filter, catalyst support, or heat recuperator by the instant process.

Electrodes or other objects of almost any shape and outline may be readily made in accordance with my invention by forming a porous layer of coherent particles, as above described, on a backing surface of the required configuration. If desired, the layer so formed may be subsequently removed from the backing surface, e.g. by the method of Fig. 2 or Fig. 3.

It will be understood that features specifically disclosed with reference to any one embodiment may be utilized to the extent of compatibility with some or all of the other systems illustrated. Thus, for instance, the flexibility of the finished electrode body illustrated in Fig. 2 may be obtained by a suitable dimensioning of the supports and layers shown in the remaining figures; also, any single sprayer shown in the drawing may represent a battery of such sprayers operating in unison.

Again, the porous mass produced by any of the above processes may have dispersed therethrough one or more different materials as discussed in connection with the dispersion of graphite (process of Fig. 4). Catalysts or getter units may be produced by spraying upon a porous support of the herein disclosed character a suitable metal or metal salt, in a liquid vehicle, e.g. as an aqueous suspension.

I claim:

1. A process for making a porous electrode, comprising the steps of forming by peripheral fusion a first layer of a given porosity from an electrochemically active material, forming on said first layer a second layer in like manner of said material having a lower porosity, and forming on said second layer a third layer of said material, said third layer having a porosity similar to that of said first layer.

2. A process for making a porous battery electrode, comprising the steps of forming three superposed layers by the spraying of peripherally melted particles of active material, the inner one of said layers being of lower porosity than the remaining layers.

3. A porous electrode comprising a body of discrete particles of active material joined together by peripheral fusion and arranged in a plurality of substantially homogeneous layers, said layers including at least one inner layer sandwiched between a pair of outer layers, said inner layer being of a higher density than said outer layers.

References Cited in the file of this patent

UNITED STATES PATENTS

| | | |
|---|---|---|
| 1,128,175 | Morf | Feb. 9, 1915 |
| 2,037,848 | Brennan | Apr. 21, 1936 |
| 2,104,018 | Brennan | Jan. 4, 1938 |
| 2,123,227 | Bieling | July 12, 1938 |
| 2,251,913 | Brennan | Aug. 12, 1941 |
| 2,330,202 | Brennan | Sept. 28, 1943 |
| 2,361,378 | Brennan | Oct. 31, 1944 |
| 2,480,839 | Daniel | Sept. 6, 1949 |
| 2,678,342 | Porter | May 11, 1954 |
| 2,697,671 | Brennan | Dec. 21, 1954 |
| 2,700,365 | Pawlyk | Jan. 25, 1955 |
| 2,712,565 | Williams, Jr. | July 5, 1955 |
| 2,729,190 | Pawlyk | Jan. 3, 1956 |